(12) United States Patent
Arumilli

(10) Patent No.: US 12,645,618 B1
(45) Date of Patent: Jun. 2, 2026

(54) COMMUNICATING PROCESSOR MEMORY REQUEST PRIORITY TO DISTRIBUTED MEMORY CONTROLLERS

(71) Applicant: Astera Labs, Inc., Santa Clara, CA (US)

(72) Inventor: Subbarao Arumilli, Cupertino, CA (US)

( * ) Notice: Subject to any disclaimer, the term of this patent is extended or adjusted under 35 U.S.C. 154(b) by 251 days.

(21) Appl. No.: 18/100,464

(22) Filed: Jan. 23, 2023

(51) Int. Cl.
    *G06F 13/18* (2006.01)
    *G06F 13/16* (2006.01)
    *G06F 13/42* (2006.01)

(52) U.S. Cl.
    CPC .......... *G06F 13/18* (2013.01); *G06F 13/1668* (2013.01); *G06F 13/4221* (2013.01)

(58) Field of Classification Search
    CPC ... G06F 13/18; G06F 13/1668; G06F 13/4221
    USPC ........................................................ 711/151
    See application file for complete search history.

(56) References Cited

U.S. PATENT DOCUMENTS

| | | | | |
|---|---|---|---|---|
| 2009/0119471 A1* | 5/2009 | Hur | ..................... | G06F 12/0862 |
| | | | | 711/E12.001 |
| 2019/0391936 A1* | 12/2019 | Stalley | ................ | G06F 13/4009 |
| 2021/0096749 A1* | 4/2021 | Martin | .................. | G06F 3/0649 |
| 2022/0413719 A1* | 12/2022 | Wu | ......................... | G06F 3/0659 |
| 2023/0280940 A1* | 9/2023 | Del Gatto | .......... | G06F 11/1004 |

* cited by examiner

*Primary Examiner* — Jared I Rutz
*Assistant Examiner* — Wei Ma
(74) *Attorney, Agent, or Firm* — Zhichong Gu

(57) ABSTRACT

A host-originated memory read request is received by a non-host device from a host device to retrieve data stored at a device memory attached to the non-host device, the memory host-originated read request from the host device including a specific host-assigned memory read request type attribute. Responsive to receiving the host-originated memory read request, the non-host device generates a device-memory-bound memory read request corresponding to the host-originated memory read request, a priority mapping being applied to map the specific host-assigned memory read request type attribute to a specific device-memory priority selected from among a plurality of device-memory priorities. The device-memory-bound memory read request is sent along with the specific device-memory priority to a memory controller of the device memory to access the data stored at the device memory.

21 Claims, 8 Drawing Sheets

100

100

| TC [1:0] | 00 | 01 | 10 | 11 |
|---|---|---|---|---|
| Mapped priority default [3:0] | 0001 | 0010 | 0100 | 1000 |
| Mapped internal priority [3:0] | 0100 | 0001 | 1000 | 0010 | receive a host-originated memory read request
of a specific type 402 generate a device-memory-bound memory read
request with a specific device-memory priority 404 send the device-memory-bound memory read
request along with the specific device-memory
priority 406

FIG. 4

COMMUNICATING PROCESSOR MEMORY REQUEST PRIORITY TO DISTRIBUTED MEMORY CONTROLLERS

TECHNICAL FIELD

Embodiments relate generally to computing systems, and, more specifically, to techniques for communicating processor memory request priority to distributed memory controllers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The explosion of data and mainstreaming of specialized workloads-like artificial intelligence (AI) and machine learning (ML)—have given rise to heterogeneous computing in which graphics processing units (GPUs) and/or AI processors and/or other expanders or accelerators such as memory expanders/accelerators work side-by-side with host computing devices such as (e.g., general-purpose, etc.) central processing units or CPUs. Peripheral Component Interconnect Express (PCIe) and/or Compute Express Link (CXL) connectivity solutions can be built to enable relatively simple or complex topologies of various devices, memories, processors, servers, etc., to expand memory and accelerate workloads in a flexible, responsive and efficient way, while at the same time improving availability, bandwidth and performance.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 4 illustrates an example process flow; and

DETAILED DESCRIPTION

Figure 1A:
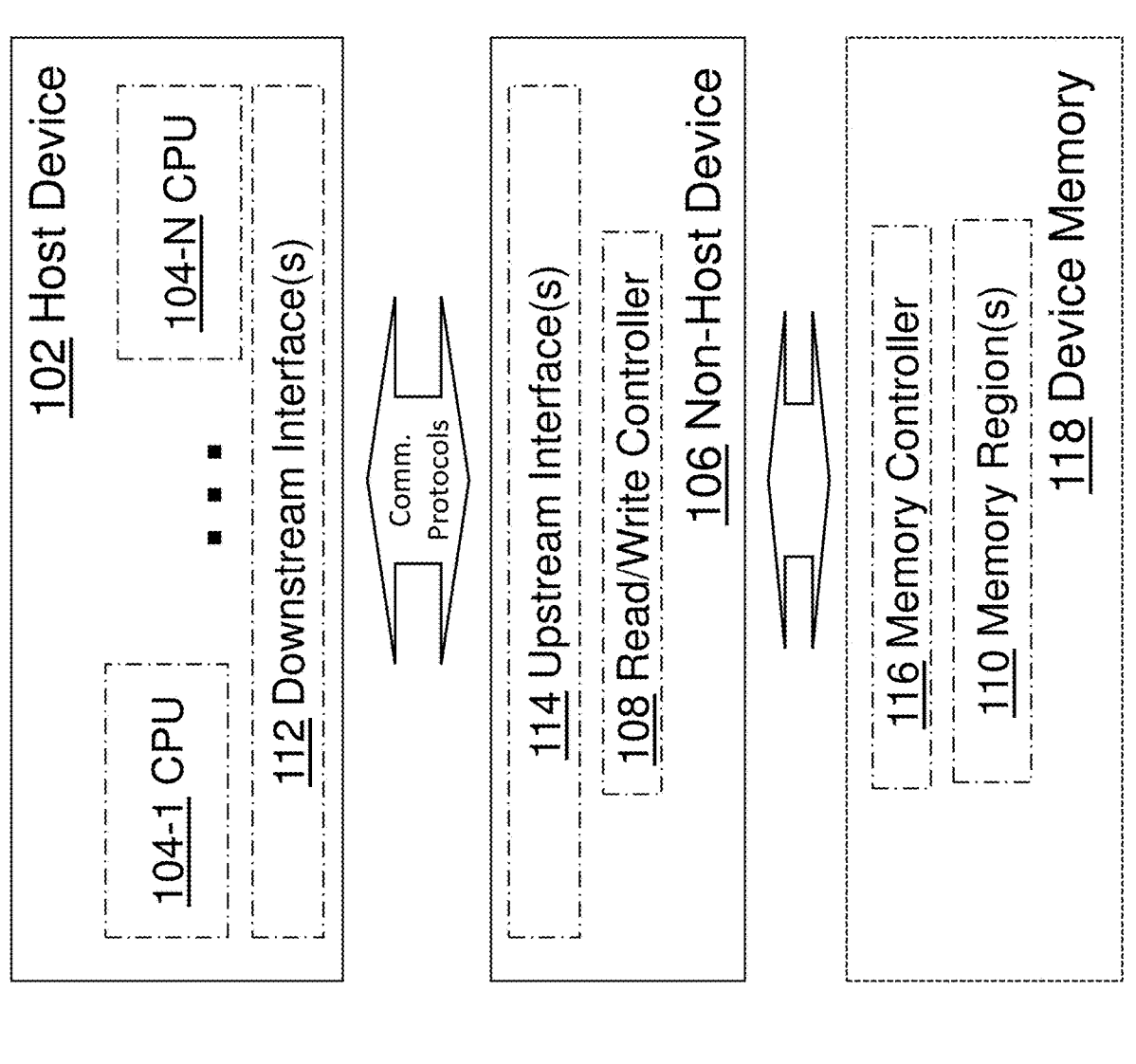
FIG. 1A and FIG. 1B illustrate example heterogeneous computing systems.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. Structural Overview
    2.1. Host Computing Device
    2.2. CPUs in the Host
    2.3. Downstream Interfaces
    2.4. Non-Host Computing Device
    2.5. Upstream Interfaces
    2.6. Read/Write Controller
    2.7. Device Memory
    2.8. Memory Regions
    2.9. CPU Caches
    2.10. Request-Type-to-Primority Mapper
    2.11. Miscellaneous
3.0. Functional Overview
    3.1. Memory Read Request Hierarchy
    3.2. Memory Read Request Types
    3.3. Mapping Request Types to Priorities
    3.4. Diffentiated Priority Treatments
    3.5. Example Process Flows
4.0. Implementation Mechanism—Hardware Overview
5.0. Extensions and Alternatives

1.0. GENERAL OVERVIEW

In a heterogeneous computing system, memory read requests may be communicated by a host device to a non-host device to read or retrieve data items from a device media attached to the non-host device.

Under some approaches, a memory controller operating with the device memory is not informed of urgencies of these memory read requests. The memory controller may perform data retrievals for relatively non-urgent memory read requests with higher priorities than data retrievals for relatively urgent memory read requests. As a result, overall response time or performance of the heterogeneous computing system may be negatively impacted.

In contrast, under techniques as described herein, host-originated memory read requests carry data field values such as traffic class (TC) values, reserved data field values, standard-based or proprietary data field values, etc., to indicate specific types of the host-originated memory requests.

In response to receiving the host-originated memory read requests, the non-host device can map these specific memory read request types to specific mapped default or device-specific internal priorities. Differentiated resource allocations such as queues, sizes of queues, buffers, sizes of buffers, guaranteed memory bandwidths, etc., can be allocated by the non-host device in handling memory read requests assigned with different mapped default or device-specific internal priorities. Additionally, optionally or alternatively, different sets of operations such as enqueuing, dequeuing, message transformation, guaranteed memory bandwidth allocation, buffer retention, etc., can be allocated by the non-host device in handling memory read requests assigned with different mapped default or device-specific internal priorities.

Different request-type-to-internal-priority mappings such as a system default mapping and/or customer-specified mappings can be supported, implemented or adopted relatively efficiently at the factory or in the field. For example, the non-host device may configure or initialize one or more mapping registers to a set of default values implementing a mapping from memory read request types indicated by the host device to mapped default internal priorities implemented or supported by the non-host device. Thereafter, the same mapping registers may be configured with a different set of customer specified values implementing a customer specified mapping from memory read request types indicated by the host device to mapped customer specified internal priorities to be implemented or supported by the non-host device.

A memory controller of a device memory attached to the non-host device supports or implements its own priorities in handling memory reads from the device memory as requested by the non-host device. The non-host device can further map the specific memory read request types as set by the host device and/or the specific mapped default or device-specific internal priorities as mapped by the non-host device to specific device-memory-specific priorities supported or implemented by the device memory or the memory controller operating with the device memory.

Similar to the above mentioned request-type-to-internal-priority mappings, different device-memory-specific-priority mappings such as a system default mapping and/or customer-specified mappings can be supported, implemented or adopted relatively efficiently at the factory or in the field. For example, the non-host device may configure or initialize one or more second mapping registers to a set of default values implementing a default mapping from mapped internal priorities currently supported or implemented by the non-host device to device-memory-specific priorities implemented or supported by the device memory or the memory controller operating with the device memory. The same mapping registers may be also configured with a different set of customer specified values implementing a customer specified mapping from mapped internal priorities currently supported or implemented by the non-host device to device-memory-specific priorities implemented or supported by the device memory or the memory controller operating with the device memory.

In response to cache misses, the host device or a home agent therein can determine, based at least in part on looking up (host physical) addresses referencing data items in a system coherent address space or address regions therein, determine whether data reads should go to the local memory or the device memory (or CXL memory). For example, the home agent may issue host originated memory read requests of the demand request type to the non-host device to access or read a data item stored in the device memory attached to the non-host device. The data item may represent a portion of a current instruction to be executed, or data attendant to the current instruction needed, by the CPU. The non-host device may accord a relatively high or the highest priority to a host originated memory read request of the demand request type and process the request with relatively high or the highest urgency.

In addition, based at least in part on the current and/or previously executed instructions and previously accessed data, the home agent may issue host originated memory read requests of the prefetch request type to the non-host device to access or read a data item stored in the device memory attached to the non-host device. The data item may represent a portion of a predicted future instruction to be executed, or data attendant to the predicted future instruction needed, by the CPU. The non-host device may accord a lower priority than that of the demand request type to a host originated memory read request of the prefetch request type and process the request with lower urgency as compared with processing the demand request type.

The host device may attempt to access data concurrently from more than one place. For example, while a data item is being looked up in cache lines of CPU caches, the host device may initiate lookup operations in other cache lines of other CPU caches and/or local or non-local memories and/or device memories (e.g., through CXL communication links via memory expanders or memory accelerators, etc.). For example, the host device or the home agent may determine a speculative read should be triggered while looking at a current cache line or encountering a cache miss. If the data item is successfully retrieved in lookup operations with respect to the last level cache(s), the host device or the home agent can use the successfully retrieved data item, drop the speculative read or otherwise avoid following up the speculative read with a real or actual read.

Under techniques as described herein, speculative reads of different priorities may be supported or differentiated by the host device and/or the non-host device. For example, a CPU or processor core in the host device can be one of a plurality of different CPUs or processor cores in the host device, for example, on the same chip. Cache coherence or pooling can be implemented among different caches of the CPUs or processor cores. Additionally, optionally or alternatively, memory pooling may be implemented among different CPUs or processor cores and/or among different host devices. In some operational scenarios, speculative reads triggered in lookup or retrieval operations performed with respect to local cache or memory to a CPU or a processor core may be assigned with relatively high priorities. In comparison, speculative reads triggered in lookup or retrieval operations performed with respect to non-local cache or memory to a CPU or a processor core may be assigned with relatively low priorities.

During data retrieval operations, especially when computational and/or buffer resources are constrained (e.g., with relatively high utilization/loading and/or fill levels, etc.), the non-host device may drop relatively low priority speculative reads while maintaining relatively high priority speculative reads.

In some operational scenarios, priority based processing of host-originated memory reads can be implemented by CXL devices as well as non-CXL devices. For example, in some operational scenarios, some or all techniques as described herein may be implemented by a local memory controller in the host device (e.g., DDR controller operating with local memory attached to the host device, etc.).

Approaches, techniques, and mechanisms support prioritized memory reads to device memories. A host-originated memory read request is received by a non-host device from a host device to retrieve data stored at a device memory attached to the non-host device, the memory host-originated read request from the host device including a specific host-assigned memory read request type attribute. Responsive to receiving the host-originated memory read request, the non-host device generates a device-memory-bound memory read request corresponding to the host-originated memory read request, a priority mapping being applied to map the specific host-assigned memory read request type attribute to a specific device-memory priority selected from among a plurality of device-memory priorities. The device-memory-bound memory read request is sent along with the specific device-memory priority to a memory controller of the device memory to access the data stored at the device memory.

In other aspects, the inventive subject matter encompasses computer apparatuses and computer-readable media configured to carry out the foregoing techniques.

2.0. STRUCTURAL OVERVIEW

FIG. 1A illustrates an example heterogeneous computing system (or device) 100 in an embodiment. Heterogeneous computing system 100 comprises a (e.g., CXL, non-CXL, etc.) host computing device 102, a (e.g., CXL, non-CXL, etc.) non-host computing device 106, a device memory (device) 118, and so on. Some or all of the processing components described herein are implemented in central processing units (CPUs), application-specific integrated circuits (ASICs), field programmable gate arrays (FPGAs), microcontrollers, graphics processing units (GPUs), base boards, mother boards, add-in cards, EDSFF cards, line cards in a chassis, or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the heterogeneous computing system 100 may include more or fewer processing components than illustrated in FIG. 1A. For example, the heterogeneous computing system 100 may include additional computing devices or processing components with which the host computing device 102, or some or all of the CPUs 104-1 through 104-N therein, operatively communicate through CXL or non-CXL interfaces and/or communication protocols.

2.1. Host Computing Device

As illustrated in FIG. 1A, a host computing device 102 may include one or more CPUs 104-1 through 104-N, where N represents an integer no less than one (1). The host computing device 102 may further include one or more downstream interface(s)—or downstream port(s)—112; etc. In some operational scenarios, the host computing device 102 may be of a different computing device type as compared with non-host computing devices such as accelerators, memory expanders, CXL Type 3 devices, non-CXL-Type-3 devices, etc.

In various operational scenarios, the host computing device 102 may include more or fewer processing components than illustrated in FIG. 1A and may be communicatively linked with additional processing components in and out of the heterogeneous computing system 100. In some operational scenarios, the host computing device 102 may be attached to or may operatively communicate with locally attached memories (e.g., dual in-line memory modules or DIMMs, etc.). The locally attached memories can be pooled among CPUs (e.g., 104-1 through 104-N, etc.) or processor cores in the host computing device 102 using (e.g., DDR5, CXL, non-CXL, etc.) communication protocols based memory pooling operations. Additionally, optionally or alternatively, the host computing device 102 may be attached to or may operatively communicate with some or all of: solid state drives (SSD) through Non-Volatile Memory Express (NVME) interfaces; just a bunch of GPUs (JBoG) through PCIe based communications links, riser cards, network interface cards (NICs), etc.; other host computing devices through non-transparent bridges; AI processors; just a bunch of flashes (JBoF) through memory expansion devices and/or cable extender cards with re-timers and/or transceivers; spine and/or leaf switches through NICs; etc. Additionally, optionally or alternatively, non-local memory such as the device-attached memory 118

(attached to the non-host computing device 106) can also be pooled to and accessed by some or all of the CPUs 104-1 to 104-n.

2.2. CPUs in the Host

The host computing device 102 may include one or more CPUs (e.g., 104-1 through 104-N) each of which may represent a processor core that can be used to access, decode and/or execute instructions of an installed or running operating system (OS) or of various system and/or user computing processes running on top of or inside the OS. The processor core may communicate with other processing components and/or local memories and/or HDM (device attached) memories to carry out operations requested or represented in the instructions. System or user data generated, processed, used or outputted by the processor core during operation may be stored, buffered, cached, read, written, updated, etc., in the memories locally attached to the host computing device 102 and/or in the HDM memories, the latter of which are not locally attached to the host computing device 102 but rather attached to another computing device such as a non-host device 106.

2.3. Downstream Interfaces

The host computing device 102 may include one or more downstream interfaces 112 used by a processor core such as a CPU in the host computing device 102 to carry out memory access transactions relating to data storing, buffering, caching, reading, updating, etc., with one or more non-host computing devices such as 106 of FIG. 1A. Memory access requests may be generated, communicated or made by the processor core in these memory access transactions to the non-host devices via the one or more downstream interfaces 112 using communication protocols (e.g., over PCIe, CXL protocols, etc.).

In return, the host computing device 102 or the processor core therein can receive-through the one or more downstream interfaces 112 using the communication protocols-memory access responses in these memory access transactions from the non-host devices. These responses are responsive to the memory access request made or issued by the host computing device 102. These memory access responses may carry first data field values to indicate whether memory access operations requested in the memory access requests have been completed by the non-host devices successfully or unsuccessfully (or failed). Additionally, optionally or alternatively, these memory access responses received by the host computing device 102 may carry second data field values to provide or return any requested data items. These data entries may be read from or stored, buffered or cached at memory entries in a device memory 118 attached to the non-host device 106.

2.4. Non-Host Computing Device

The non-host computing device 106 may represent a (e.g., CXL, non-CXL, etc.) accelerator, a (e.g., CXL, non-CXL, etc.) memory expander, CXL Type 3 devices, non-CXL-Type-3 devices, etc. As illustrated in FIG. 1A, a non-host computing device 106 may include a (host-originated) read/write controller 108, which can be implemented with IC circuits such as ASICs or FPGAs (not shown) of the non-host computing device 106. The non-host computing device 106 may also include one or more (e.g., CXL, non-CXL, etc.) upstream interface(s)—or upstream port(s)—114 used to communicate with the host computing device 102.

In various operational scenarios, the non-host computing device 106 may include more or fewer processing components than illustrated in FIG. 1A and may be communicatively linked with additional processing components in and out of the heterogeneous computing system 100.

2.5. Upstream Interfaces

The non-host computing device 106 may include one or more upstream interfaces 114 used by a computing processor in the non-host computing device 102 to carry out memory access transactions relating to data storing, buffering, caching, reading, updating, etc., with one or more memory regions such as 110 of FIG. 1A in a device memory 118. Memory access requests may be received by the non-host computing device 106 as a part of these memory access transactions via the one or more upstream interfaces 114 using the communication protocols (e.g., over PCIe, etc.).

In response, the non-host computing device 106 may invoke the read/write controller 108 to translate host physical addresses into corresponding device physical addresses and/or access specific memory regions as well as specific memory entries as referenced or identified by the device physical addresses and/or error handling or logging if any of these translation or memory access operations encounters error or failure.

The non-host computing device 106 can generate and send-through the one or more upstream interfaces 114 using the communication protocols-memory access responses in these memory access transactions to the host computing device 102. These responses are responsive to the memory access request made or issued by the host computing device 102 and carry or include values for a number of data fields. These memory access responses may carry first data field values to indicate whether memory access operations requested in the memory access requests have been completed by the non-host computing device 106 successfully or unsuccessfully (or failed). Additionally, optionally or alternatively, these memory access responses sent by the non-host computing device 106 may carry second data field values to provide or return any requested data items in specific memory regions and specific memory entries therein as referenced by translated device physical addresses corresponding to some or all of the host physical addresses referenced in the host originated requests. These data entries may be read from or stored, buffered or cached at the specific memory regions and the specific memory entries therein as referenced by the translated device physical addresses corresponding to some or all of the host physical addresses.

2.6. Read/Write Controller

The non-host computing device 106 may include software (SW), hardware (HW), firmware, or a combination of one or more of the foregoing, that implements (memory) read/write controller 108.

During operation, for a memory access request received from the host computing device 102, the read/write controller 108 can be invoked by the non-host computing device 106 to provide a memory access response.

In some operational scenarios, the memory access response generated by the read/write controller 108 may include one or more data items (or fields) derived from a buffer entry or entries in (e.g., temporary write, etc.)

buffer(s)—separate from the device memory 118 or memory regions 110 therein—maintained by the read/write controller 108.

Figure 1B:
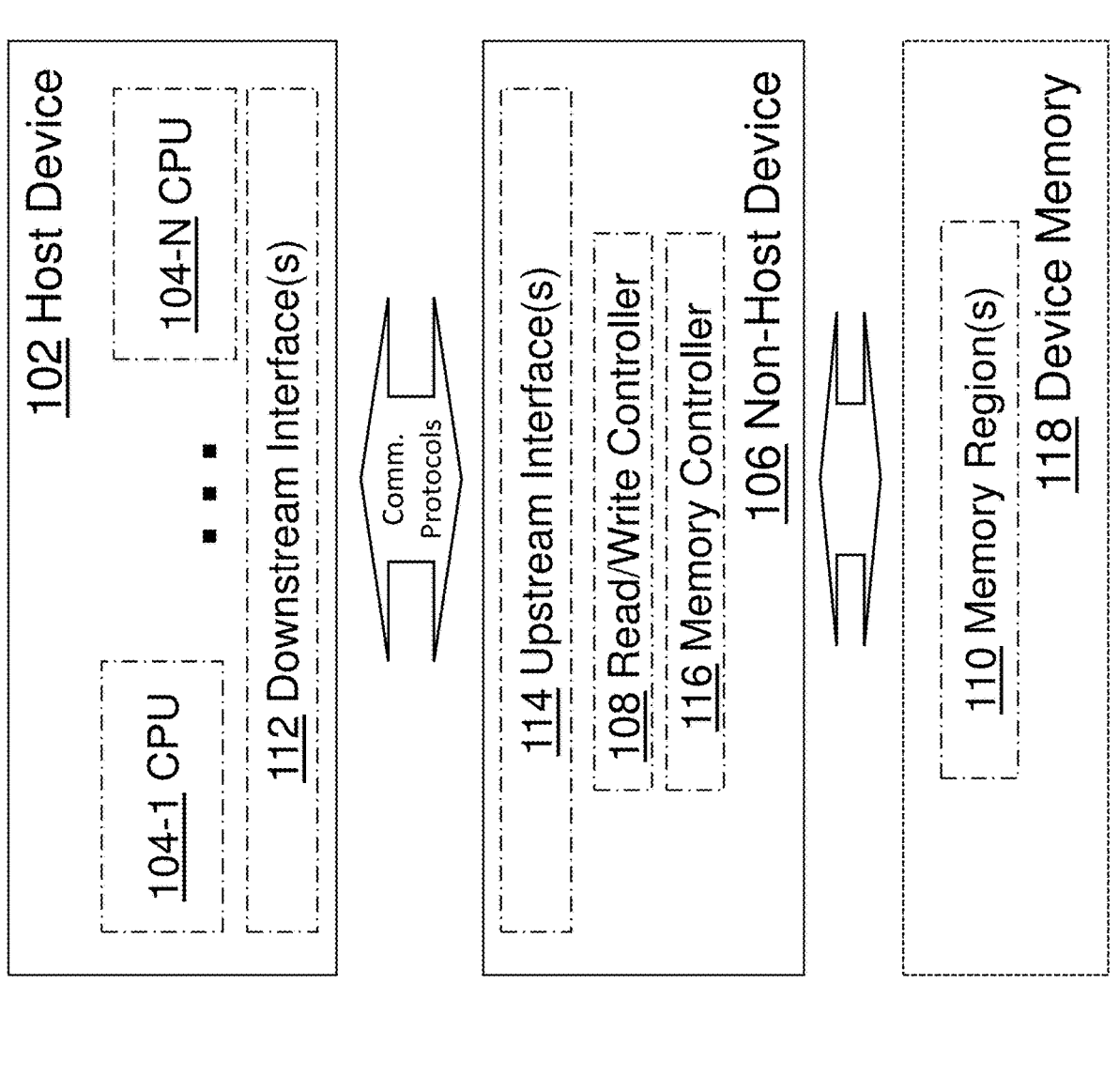

In some operational scenarios, the memory access response generated by the read/write controller 108 may include one or more data items (or fields) derived from a memory entry or entries in the device memory 118 or memory regions 110 therein. For example, the read/write controller 108 may issue device memory read or write requests to the device memory 118—or a memory controller 116 therein—and receive device memory read or write responses from the device memory 118 or the memory controller 116. The device memory read or write responses as received from the device memory 118 or the memory controller 116 may be used by the read/write controller 108 to generate or produce the one or more data items to be included in the memory access response sent back by the non-host device 106 to the host device 102. It should be noted that, in some other operational scenarios, the memory controller 116 may be a part of the non-host device 106 instead of the device memory 118 (which may be just a DRAM device or real memory such as DDR5 or other memory DIMMs), as illustrated in FIG. 1B.

In various operational scenarios, the non-host computing device 106 may include more or fewer processing components than illustrated in FIG. 1A and may be communicatively linked with additional processing components in and out of the heterogeneous computing system 100.

2.7. Device Memory

The device memory 118 may represent a memory device (e.g., locally, etc.) attached to the non-host device 106. As illustrated in FIG. 1A, a device memory 118 may include a memory controller 116, which can be implemented with IC circuits such as ASICs or FPGAs (not shown).

The device memory 118 may further include or operate with, or may be attached with, one or more memory regions 110. The memory regions 110 may include some or all of the same types of memory regions. Additionally, optionally or alternatively, the memory regions 110 may include different types of memory components (e.g., dynamic random access memory or DRAM, PCRAM, MRAM, ReRAM, NAND, NOR, DIMMs, SSDs, flashes, non-volatile memory, volatile memory, etc.).

The device memory 118 may be used to support (relatively low level) memory read/write operations between the read/write controller 108 in the non-host device 106 and the memory controller 116 in the device memory 118. In some operational scenarios, the device memory 118 may be implemented as a part of the non-host device 106. In some other operational scenarios, the device memory 118 may be implemented separate from but operating in conjunction with the non-host device 106.

2.8. Memory Regions

The device memory 118 may include or operate with, or may be attached with, one or more memory regions 110 that are host managed device (attached) memory under memory access or communication protocols including but not limited to the CXL.mem protocols. The memory regions 110 may have memory entries with different device physical addresses. A device physical memory may be used by the non-host computing device 106 or the read/write controller 108 therein to identify or reference a specific memory region as well as a specific memory entry in a set of memory entries in the memory region.

The memory regions 110 may be mapped to one or more host physical address ranges in the system coherent address space of the host computing device 102.

2.9. CPU Caches

Figure 2:
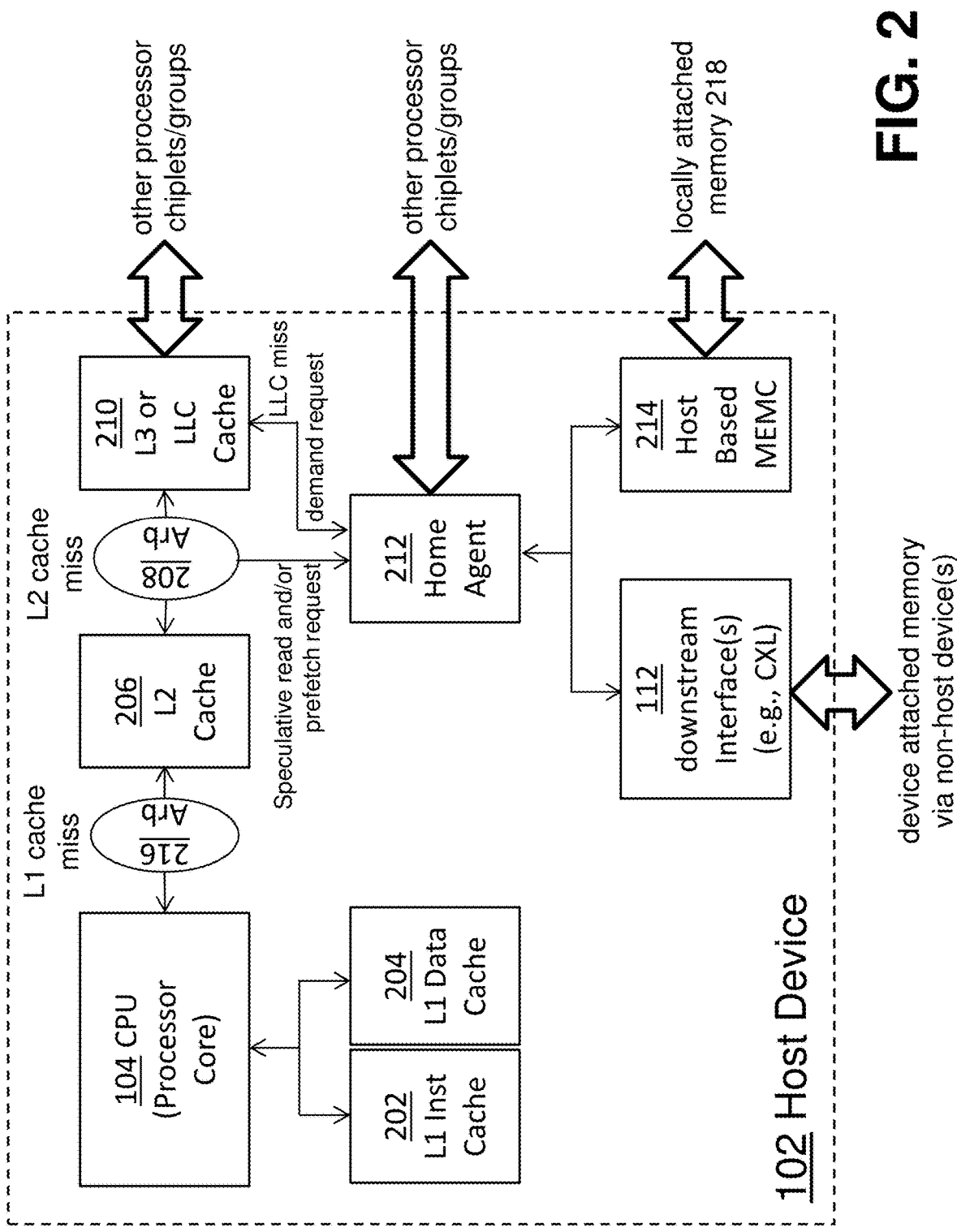
FIG. 2 illustrates an example host device.

FIG. 2 illustrates an example host device (e.g., 102, etc.) that generates different types of host-originated memory read requests in a memory request hierarchy. These memory read requests may be used by the host device 102 to access or read data items stored at a device memory such as 118 of FIG. 1A attached to a non-host computing device such as 104 of FIG. 1A.

The host device 102 may include a number of processing blocks, units or components such as illustrated in FIG. 2 operating together to implement a multi-level caching mechanism or framework for accessing data items such as instructions and/or data attendant to the instructions used by a CPU 104 (or processor core) to carry out or perform designated computational tasks or operations in connection with any in a wide variety of computer applications.

The host device 102 may include a number of caches or cache storages—comprising cache lines corresponding to or temporarily storing data items retrieved or originated from corresponding core lines in local or device memories—to help the CPU 104 to access to-be-executed instructions and data attendant to the instructions. For the purpose of illustration only, as shown in FIG. 2, the host device 102 implements a tri-level caching mechanism or framework that includes a first level cache (denoted as L1) comprised of a L1 instruction cache portion 202 and a L1 data cache portion 204; a second level cache 206 (denoted as L2); and a third level cache 210 (denoted as L3). These different levels of caches may be configured or implemented with different physical memory types, access speeds, capacity, etc. The L1 instruction cache 202 may cache instructions to be executed, or predicted to be executed, by the CPU 104, whereas the L1 data cache 202 may cache data items attendant to the instructions to be used in executing these instructions.

2.10. Request-Type-to-Primority Mapper

Figure 3A:
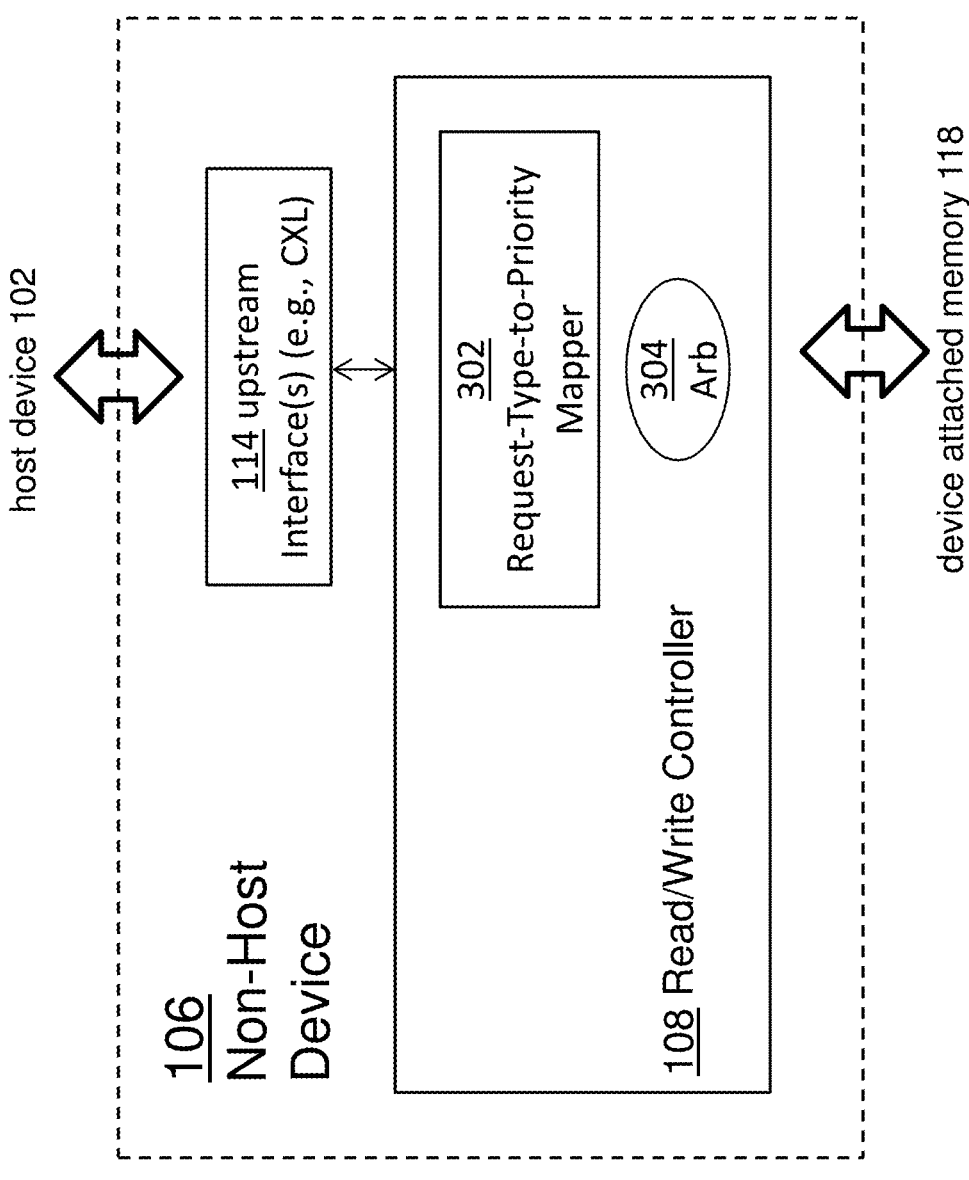
FIG. 3A and FIG. 3C illustrate example configurations of a non-host device.

FIG. 3A illustrates an example non-host device (e.g., 106, etc.) that receives host-originated memory read requests of different types in a memory request hierarchy through upstream interfaces 114 from a host device 102 and operates with a read/write controller 108 to process and/or respond to these memory read requests. These memory read requests may include specific memory addresses, references or pointers to specific data items stored at a device memory such as 118 of FIG. 1A attached to a non-host computing device such as 104 of FIG. 1A.

A host-originated memory read request (or message) received by the non-host device 106 may include one or more specific data field values set by the host device 102 to indicate its respective memory read request type among a plurality of possible or candidate memory read request types in the message request hierarchy.

The non-host device 106 or the read/write controller 108 therein may include a request-type-to-priority mapper 302 that maps or assigns data field values of memory read requests—indicating specific request types of the memory read requests—to (mapped) default priorities.

2.11. Miscellaneous

The foregoing figures illustrate only a few examples in which the techniques described herein may be practiced. Other embodiments may include fewer and/or additional components in varying arrangements.

3.0. FUNCTIONAL OVERVIEW

Memory read requests of various types in a memory request hierarchy may be used by a host device 102 of FIG. 1A or FIG. 2 to access or read data items stored at a device memory such as 118 of FIG. 1A attached to a non-host computing device such as 104 of FIG. 1A. The non-host device 106 may assign or map these memory read requests to different priorities.

Differentiated computational and/or memory resources may be allocated by the non-host device 106 and the device memory 118 to handle these memory read requests based at least in part on their respective mapped priorities. Additionally, optionally or alternatively, different sets of operations or actions can be performed by the non-host device 106 and the device memory 118 to handle these memory read requests based at least in part on their respective mapped priorities.

3.1. Memory Read Request Hierarchy

As noted, the host device 102 may include a number of caches or cache storages to help the CPU 104 to access to-be-executed instructions and data attendant to the instructions.

When the CPU 104 is looking for (current) instructions and/or data attendant to the instructions to carry out a corresponding operation, the CPU 104 first tries to find the instructions and/or data in the L1 instruction cache portion 202 and/or L1 data cache portion 204.

If the CPU 104 finds all the instructions and/or data in the L1 cache, an L1 cache hit occurs; and the operation can be executed by the CPU 104 with the instructions and/or data found in the L1 cache. However, if the CPU 104 does not find (all portions of) the instructions and/or data in the L1 cache, then an L1 cache miss occurs; and the CPU 104, or an L1 cache miss arbiter 216 operating with the CPU 104, proceeds to find (any missing portions of) the instructions and/or data in the L2 cache 206.

If the CPU 104 and/or the arbiter 216 find (all missing portions of) the instructions and/or data in the L2 cache, an L2 cache hit occurs; and the operation can be executed by the CPU 104 with the instructions and/or data found in the L2 cache 206 and/or L1 cache. However, if the CPU 104 and/or the arbiter 216 do not find (all portions of) the instructions and/or data in the L1 and L2 caches, then an L2 cache miss occurs; and the CPU 104, or an L2 cache miss arbiter 208 operating with the L2 cache 206, proceeds to find (any missing portions) of the instructions and/or data in the L3 cache 210. For illustration purposes, the L3 cache 210 represents a last level cache (LLC).

In some operational scenarios, the host device 102 may comprise one or more CPUs each of which may be configured with a respective hierarchy of multi-level caches as illustrated in FIG. 2 for the CPU 104. The CPU 104 in the host device 102 may be configured to access its own hierarchy of multi-level caches but not to access other hierarchies of multi-level caches of other CPUs. In these operational scenarios, if the CPU 104 or the arbiter 208 finds (all missing portions of) the instructions and/or data in the L3 cache 210, an L3 cache hit occurs; and the operation can be executed by the CPU 104 with the instructions and/or data found in the L3 cache 210 and/or L2 cache 206 and/or L1 cache. However, if the CPU 104 or the arbiter 208 does not find (all portions of) the instructions and/or data in the L1, L2 and L3 caches in the hierarchy of multi-level caches provisioned or configured for the CPU 104, then an L3 cache miss occurs.

In some operational scenarios, the host device 102 may comprise multiple CPUs each of which may be configured with a respective hierarchy of multi-level caches as illustrated in FIG. 2 for the CPU 104. These CPUs may collectively implement cache (memory) pooling to enable a CPU to access not only its own hierarchy of multi-level caches but also other hierarchies of multi-level caches of other CPUs. In these operational scenarios, cache lookup operations performed or initiated by the CPU 104 and/or the arbiter 208 include both (local) cache lookup operations performed with respect to the L3 or LLC cache in its own hierarchy of multi-level caches and additional (or non-local) cache lookup operations performed with respect to other hierarchies of caches of other CPUs (e.g., other processor cores, other processor chipsets, other processor groups, etc.). In these operational scenarios, if the CPU 104 and/or the arbiter 208 find (all missing portions of) the instructions and/or data in the L3 cache 210 and/or in other (non-local) caches in the other hierarchies of multi-level caches provisioned or configured for the other CPUs, an L3 cache hit occurs; and the operation can be executed by the CPU 104 with the instructions and/or data found in the L3 cache 210 and/or L2 cache 206 and/or L1 cache and/or the other (non-local) caches in the other hierarchies of multi-level caches provisioned or configured for the other CPUs. However, if the CPU 104 and/or the arbiter 208 do not find (all portions of) the instructions and/or data in the L1, L2 and L3 caches in its own hierarchy of multi-level caches provisioned or configured for the CPU 104 as well as the other (non-local) caches in the other hierarchies of multi-level caches provisioned or configured for the other CPUs, then an L3 cache miss occurs.

If the L3 cache miss occurs, then the CPU 104, or a home agent 212 operating with the CPU 104, proceeds to find (any missing portions) of the instructions and/or data in configured or local memories (e.g., 218, DRAM, DIMM, etc.) attached to the CPU 104 and/or additional configured (non-local to the CPU 104) memories respectively attached to the other CPUs, depending on a system configuration of the host device 102 and/or a system configuration of the heterogeneous computing system that includes the host device 102. As used herein, the configured or local memories 218 attached to the CPU 104 may be directly or locally accessed with corresponding memory addresses, references or pointers by the CPU 104, for example by way of a host based memory controller (MEMC) 214 operating with the home agent 212. In comparison, the additional configured (non-local to the CPU 104) memories respectively attached to the other CPUs may be directly or locally accessed with corresponding memory addresses, references or pointers by the other CPUs respectively, for example by way of other host based MEMCs operating with the other CPUs.

In some operational scenarios, a CPU (e.g., 104, etc.) in the host device 102 or the heterogeneous computing system may be configured to access its own configured or local memories (e.g., 218, etc.) through a local host-based MEMC (e.g., 214, etc.) but not to access additional (non-local to the CPU) memories of other CPUs in the host device 102 or the heterogeneous computing system. In these operational scenarios, if the L3 cache miss occurs and if the CPU 104 and/or the home agent 212 find (all missing portions of) the instructions and/or data in its own configured or local memories 218, then the corresponding operation can be executed by the CPU 104 with the instructions and/or data whose (final) missing portions are retrieved from the memories 218 locally attached to the CPU 104 through the local host-based MEMC 214. However, if the CPU 104 and/or the home agent 212 do not find (all the missing portions of) the instructions and/or data in its own configured or local memories 218, then the CPU 104 and/or the home agent 212 can start a memory access transaction by generating, and sending to the non-host device 106 through the downstream interfaces 112, a host-originated memory read request of the demand request type. The host-originated memory read request can be used by the host device 102 to access or retrieve data items stored in the device memory 118 attached to the non-host device 106 that includes all the missing portions of the instructions and the data.

In some operational scenarios, the host device 102 may comprise multiple CPUs each of which may be configured with respective configured memories such as the memories 218 to the CPU 104. These CPUs may collectively implement memory pooling to enable a CPU to access not only its own configured memories but also other configured memories of other CPUs. In these operational scenarios, local memory access operations performed or initiated by the CPU 104 and/or the home agent 212 include both (local) memory lookup operations performed—e.g., by way of the host based MEMC 214 operating with the home agent 212—with respect to the configured memories 118 attached to the CPU 104 and additional (or non-local to the CPU 104) memory access operations performed with respect to other configured memories of other CPUs (e.g., other processor cores, other processor chipsets, other processor groups, etc.). In these operational scenarios, if the L3 cache miss occurs and if the CPU 104 and/or the home agent 208 find (all missing portions of) the instructions and/or data in any combination of its own configured or local memories 218 and the other configured memories of the other CPUs, then the corresponding operation can be executed by the CPU 104 with the instructions and/or data whose (final) missing portions are retrieved from the combination of the memories 218 of the CPU 104 and the other configured memories of the other CPUs. However, if the CPU 104 and/or the home agent 212 do not find (all the missing portions of) the instructions and/or data in any combination of its own configured or local memories 218 and the other configured memories of the other CPUs, then the CPU 104 and/or the home agent 212 can start a memory access transaction by generating, and sending to the non-host device 106 through the downstream interfaces 112, a host-originated memory read request of the demand request type. The host-originated memory read request can be used by the host device 102 to access or retrieve data items stored in the device memory 118 attached to the non-host device 106 that includes all the missing portions of the instructions and the data.

Different types of host-originated memory read requests—which form a memory request hierarchy—can be generated by or originated from the host device 102 to access or read data items stored in the device memory 118 attached to the non-host device 106. Example types of host-originated memory read requests as described herein may include, but are not necessarily limited to, any, some or all of: demand requests (or the demand request type), prefetch requests (or the prefetch request type), speculative read requests (or the speculative read request type), and so on.

As used herein, a demand request refers to a request for retrieving a data item—such as (some or all portions of) instructions or data attendant to the instructions—that is needed or to be used in executing a current or present operation by a CPU (e.g., 104 of FIG. 2, etc.) of a host device (e.g., 102 of FIG. 2, etc.). A (e.g., host-originated, non-host-device bound, etc.) memory read request of the demand request type refers to a memory read request for accessing or reading such a data item stored at a device memory (e.g., 118 of FIG. 1A, etc.) attached to a non-host device (e.g., 106 of FIG. 1A, etc.).

A prefetch request refers to a request for retrieving a data item—such as (some or all portions of) instructions or data attendant to the instructions—that is not presently needed or to be used in executing a current or present operation by a CPU (e.g., 104 of FIG. 2, etc.) of a host device (e.g., 102 of FIG. 2, etc.), but that is predicted to be needed or to be used in executing a future or predicted operation by the CPU 104 of the host device 102. The data item can be anticipated, predicted, determined or identified by the CPU 104 and/or the arbiters 208 and 216 and/or the home agent 212 based at least in part on prior or present instructions executed by the CPU 104 and/or prior or present data accessed by the CPU 104 for executing these instructions. A (e.g., host-originated, non-host-device bound, etc.) memory read request of the prefetch request type refers to a memory read request for accessing or reading such a data item stored at a device memory (e.g., 118 of FIG. 1A, etc.) attached to a non-host device (e.g., 106 of FIG. 1A, etc.) in advance of the predicted or anticipated use of the data item in the future or predicted operation.

A speculative read refers to a request for performing some or all actions of retrieving a data item—such as (some or all portions of) instructions or data attendant to the instructions in executing a current/present or future/predicted operation by a CPU (e.g., 104 of FIG. 2, etc.) of a host device (e.g., 102 of FIG. 2, etc.)—before a real or actual read for the same data item is issued. This allows the host device 102 and/or a non-host device (e.g., 106 of FIG. 1A, etc.) operating with the host device 102 and/or a device memory (e.g., 118 of FIG. 1A, etc.) operating with the non-host device 106 to complete some or all actions of retrieving a data item before the real or actual read for the same data item is issued. A (e.g., host-originated, non-host-device bound, etc.) memory read request of the speculative read type refers to a memory speculative read request for completing some or all actions relating to accessing or reading such a data item stored at the device memory 118 attached to the non-host device 106 in advance of a memory (actual or real) read request being issued (generated and sent) for the data item, regardless of whether such memory (actual or real) read request is subsequently issued (generated or sent) by the host device 102 to the non-host device 106.

In various operational scenarios, the CPU 104 of FIG. 2 and/or the home agent 212 of FIG. 2 may implement one or more of a wide variety of ways to generate or send different types of memory read requests to the non-host device 106 of FIG. 1A to access data items stored at the device memory 118 of FIG. 1A attached to the non-host device 106.

In some operational scenarios, as shown in FIG. 2, memory read requests of the demand request type may be generated or sent by the home agent 212 of the host device 102 to the non-host device 106 after some or all portions of instructions and/or data attendant to the instructions remain missing after cache lookup operations (including but not limited to any cache pooling related lookup operations) and/or local memory read operations (including but not limited to any memory pooling related read operations) are completed.

It should be noted, however, that, in other operational scenarios, memory read requests of the demand request type may or may not be generated or sent subsequent to the cache lookup operations and/or the local memory read operations. For example, in some operational scenarios, a memory read request of the demand request type for a data item stored at the device memory 118 may be generated or sent by the home agent 212 in parallel, concurrently, or at least partially timewise overlapping with some or all cache lookup operations and/or the local memory read operations being performed for the data item with respect to the caches (including but not limited to pooled caches among the CPUs) and local memories (including but not limited to pooled memories among the CPUs).

In some operational scenarios, as shown in FIG. 2, memory read requests of the prefetch request type or of the speculative read type may be generated or sent by the home agent 212 of the host device 102 to the non-host device 106 after L2 cache misses occur.

It should be noted, however, that, in other operational scenarios, memory read requests of the prefetch request type or of the speculative read type may or may not be generated or sent subsequent to the L2 cache misses. For example, in some operational scenarios, a memory read request of the prefetch request type or the speculative read type for a data item stored at the device memory 118 may be generated or sent by the home agent 212 in parallel, concurrently, or at least partially timewise overlapping with some or all cache lookup operations before, while, or after any L2 miss that may occur.

A memory read request may be represented or conveyed by the host device 102 or the home agent 212 therein to the non-host device 106 using a message such as a normative message in compliance with an applicable specification as defined in an industry standard such as the CXL specification or standard, a proprietary communication link specification, etc. The message may contain a message header, a message payload, etc.

3.2. Memory Read Request Types

A host-originated memory read request (or message) received by the non-host device 106 may include one or more specific data field values set by the host device 102 to indicate its respective memory read request type among a plurality of possible or candidate memory read request types in the message request hierarchy.

In some operational scenarios, the host-originated memory read request may represent a CXL message (e.g., M2S Req. M2S RWD, etc.) as specified in the CXL standard-based specification. A data field such as a traffic class (TC) data field in the CXL message may be set by the host device 102 to a specific value to indicate, or convey to the non-host device 106, the specific request type among the plurality of possible or candidate memory read request types.

Any in a wide variety of memory request type specification, mappings or schemes may be defined, specified, shared and/or implemented by the host device 102 and/or the non-host device 106 to set, interpret and/or map specific values of the data fields to corresponding specific memory read request types.

By way of example but not limitation, a value of "00" for the TC field in a host-originated memory read request may be set by the host-device 102 to indicate the request as a relatively low priority speculative read. Examples of relatively low priority speculative reads may include, but are not necessarily limited to only, cache check speculative reads or some other speculative reads that may be issued at relatively early time points or stages in corresponding host-based read operations and that may have relatively low probabilities of being followed up by subsequent real or actual reads (or corresponding host-originated memory (actual or real) read requests of the demand type). In some operational scenarios, a relatively low priority speculative read or a corresponding host-originated memory read request can be issued in connection with a data item to be retrieved in—or to be followed by a real or actual read represented by—a demand request and/or a prefetch request, after an L1 cache miss, after an L2 cache miss, before or while completing a L2 or LLC cache lookup with pooled caches of other CPUs, before or while completing memory read(s) directed to the local memory or pooled memory, or the like. Additionally, optionally or alternatively, in some operational scenarios, a relatively low priority speculative read or a corresponding host-originated memory read request can be issued in connection with a data item to be retrieved in—or to be followed by a real or actual read represented by—a prefetch request but not a demand request.

In comparison, a value of "01" for the TC field in a host-originated memory read request may be set by the host-device 102 to indicate the request as a relatively high priority speculative read. Examples of relatively high priority speculative reads may include, but are not necessarily limited to only, speculative reads that may be issued at relatively late time points or stages in corresponding host-based read operations and that may have relatively high probabilities of being followed up by subsequent real or actual reads (or corresponding host-originated memory (actual or real) read requests of the demand type). In some operational scenarios, a relatively high priority speculative read or a corresponding host-originated memory read request can be issued in connection with a data item to be retrieved in—or to be followed by a real or actual read represented by—a demand request and/or a prefetch request, after an L2 cache miss, after an L3 or LLC cache miss, while completing a L2 or LLC cache lookup with pooled caches of other CPUs, while completing memory read(s) directed to the local memory or pooled memory, or the like. Additionally, optionally or alternatively, in some operational scenarios, a relatively high priority speculative read or a corresponding host-originated memory read request can be issued in connection with a data item to be retrieved in—or to be followed by a real or actual read represented by—a demand request but not a prefetch request.

A value of "10" for the TC field in a host-originated memory read request may be set by the host-device 102 to indicate the request as a (e.g., sequential or stride, etc.) prefetch request, whereas a value of "11" for the TC field in a host-originated memory read request may be set by the host-device 102 to indicate the request as an (on) demand request. In some operational scenarios, the TC field can be set a specific value based on a pre-designated or dynamic adaptable priority of a computer application that is currently running on a CPU or host device. The priority of the computer application can be determined by many different ways. For example, a user may sign up with an operator of the heterogeneous computing system with a higher than average cost to upgrade priorities of their computer applications running or hosted in the heterogeneous computing system. These priorities may include relatively high priorities for memory access transactions originated or triggered by their computer applications. Additionally, optionally or alternatively, the operator of the heterogeneous computing system may guarantee a specific level of memory bandwidth to specific computer applications. Based on current bandwidth usages, the operator or the system can momentarily or for a time duration set or upgrade priorities of the computer applications or memory requests originated or triggered therefrom to relatively high priorities. The TC field or another like data field may be set to specific values to signal these priorities. Additionally, optionally or alternatively, a current CPU or processor core in the heterogeneous computing system may receive or handle memory requests originated from other CPUs or other processor cores. These memory requests can be set to different priorities based on (e.g., current, impending, etc.) bandwidth usages or memory loads using different specific values of the TC field or another like data field.

The host device 102 may implement these mappings to set one or more data fields such as the TC field of memory read requests to different specific values to differentiate these requests among different types, so that the downstream non-host device 106 or non-host based memory controllers can correctly interpret or map (back) the specific values of the data fields in the requests to corresponding specific types in the memory read request hierarchy. Hence, the non-host device 106 or the memory controllers operating with the non-host device 106 or the device memory 118 (e.g., a DDR memory system, etc.) can accord different (e.g., different, device specific, etc.) priorities or perform different (sets of) operations with respect to these different memory read request types. If a host device implements or adopts different mappings between data field values and memory read request types, a non-host device as described herein can remap accordingly to corresponding memory read request types and operate with device memories or non-host based memory controllers to accord different (e.g., different, device specific, etc.) priorities or perform different (sets of) operations with respect to these different memory read request types.

3.3. Mapping Request Types to Priorities

Figure 3B:
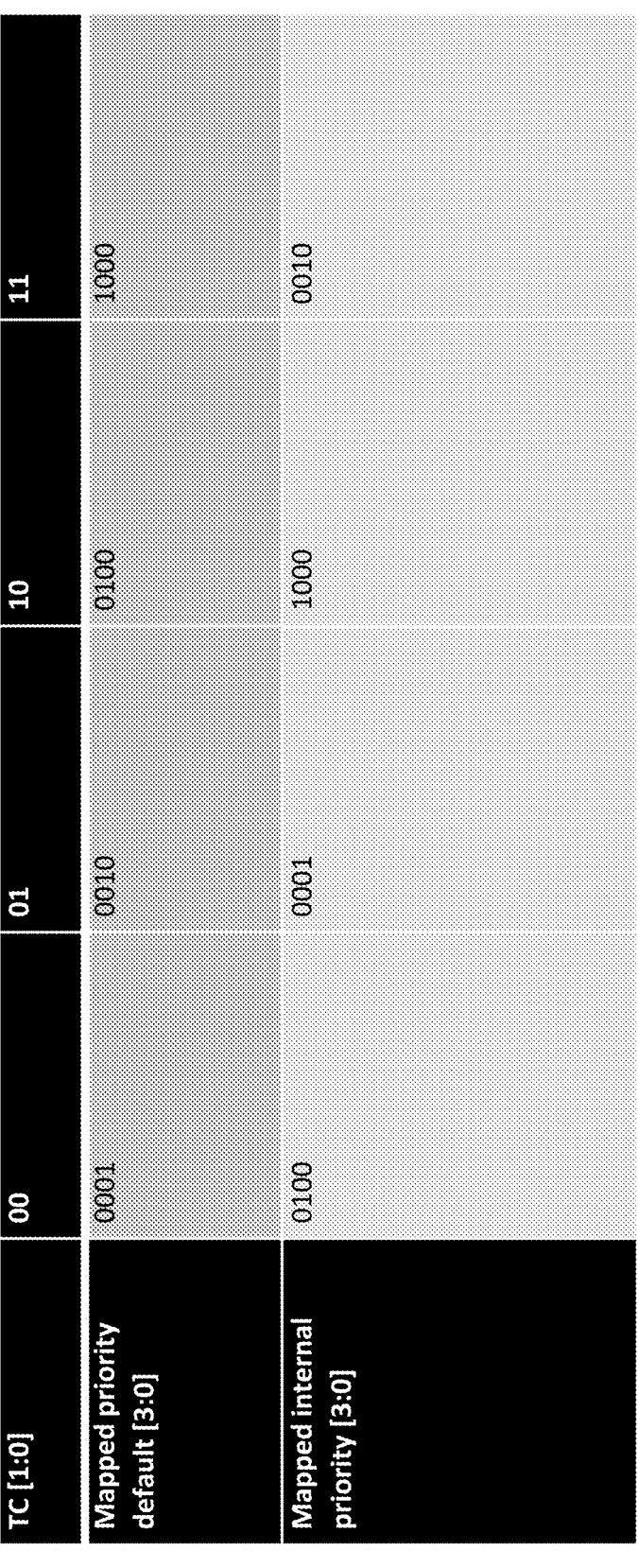
FIG. 3B illustrates an example mapping table used to map priorities in connection with host-originated memory read requests.

As illustrated in a mapping table of FIG. 3B, a request-type-to-priority mapper 302 of FIG. 3A may implement one-to-one mappings to map TC values-indicating specific request types of the memory read requests; in the first row of the mapping table of FIG. 3B-carried or included in received host-originated memory read requests (or corresponding messages) to respective (mapped) default priorities in the second row of the mapping table of FIG. 3B.

Additionally, optionally or alternatively, the request-type-to-priority mapper 302 may implement device-specific mappings to map the respective (mapped) default priorities as shown in the second row of the mapping table of FIG. 3B to corresponding device-specific internal priorities supported/implemented by the non-host device 106 and illustrated in the third row of the mapping table of FIG. 3B. These device-specific mappings implemented by the request-type-to-priority mapper 302 may be one-to-one, one-to-many or many-to-one. Some of the default and/or device-specific mappings may be implemented in part or in whole with one or more register remap functions.

The non-host device 106 or the read/write controller 108 may allocate different system and/or processing resources to different types of host-originated memory read requests based on the mapped default priorities and/or mapped device-specific internal priorities of these memory read requests.

In some operational scenarios, the non-host device 106 or the read/write controller 108 maintain separate request ingress queues for some or all of the different types in the memory read request hierarchy. For example, four different request ingress queues (not shown) may be used to respectively enqueue into four different types of host-originated memory read requests. As noted, these different types can be indicated with, or can correspond to, four different TC values that are carried or included in these memory read requests (or messages) received by the non-host device 106 from the host device 102. Each request ingress queue among the different request ingress queues can be assigned or used for enqueuing received host-originated memory read requests for a respective TC value of the four different TC values and/or for a respective priority of the mapped (e.g., default, device-specific internal, etc.) priorities. The request ingress queue maintains the memory read requests belonging to that TC value or priority and a schedule to forward these requests or to send corresponding device-memory-bound memory reads—generated by the non-host device 106 from the host-originated memory read requests—to the device memory 118 or the device memory controller 116 therein.

As illustrated in FIG. 3A, an arbiter 304 can be used to service these request ingress queues. The arbiter 304 can prioritize, schedule and perform dequeuing operations to dequeue the host-originated memory read requests from these different request ingress queue. The dequeued memory read requests may be used to generate corresponding device memory reads or device-memory-bound memory read requests that can be issued or sent to the device memory 118 or a device memory controller therein to carry out retrieving data items referenced in the host-originated memory read requests.

In some operational scenarios, different sets of operations/actions may be taken with these different types of memory read requests. For example, at each clock cycle, the arbiter 304 may dequeue memory requests assigned with relatively high mapped (e.g., default, device-specific internal, etc.) priorities at a relatively high number as compared with memory read requests of relatively low mapped (e.g., default, device-specific internal, etc.) priorities. Hence, the memory read requests of the relatively high priorities or corresponding device-memory-bound memory reads may be processed and/or sent to the device memory 118 by the non-host device 106 with relatively low latencies.

The device-memory bound memory reads may be received and processed by the device memory 118 and a (device) memory controller 116 of FIG. 1A therein. The device memory controller 116 may be configured to assign different device-memory-specific priorities to device-memory-bound memory reads (or requests/messages) from the non-host device 106. By way of example but not limitation, the device memory controller 116 may support or implement two different device-memory-specific priorities such as a first device-memory-specific priority and a second device-memory-specific priority that is lower than the first device-memory-specific priority.

The read/write controller 118 or the arbiter 304 in the non-host device 106 may translate or map the TC values of the host-originated memory read requests—or the mapped (e.g., default, device-specific internal, etc.) priorities supported or implemented by the non-host device 106 derived from the TC values—to corresponding device-memory-specific priorities supported or implemented by the device memory 118 or the memory controller 116 therein.

By way of example but not limitation, the TC values of "00" and "01" in (a subset of) the host-originated memory read requests may be mapped or translated by the read/write controller 118 or the arbiter 304 in the non-host device 106 to the second device-memory-specific priority (or device-memory controller low priority) in corresponding device-memory-bound memory reads (or requests/messages). In comparison, the TC values of "10" and "11" in (a different subset of) the host-originated memory read requests may be mapped or translated by the read/write controller 118 or the arbiter 304 in the non-host device 106 to the first device-memory-specific priority (or device-memory controller high priority) in corresponding device-memory-bound memory reads (or requests/messages).

TC-to-mapped-internal-priority mappings between TC values and corresponding mapped default or device-specific internal priorities as described herein can be implemented using a first mapping register with a first priority mapping function. Additionally, optionally or alternatively, mapped-internal-priority-to-device-memory-priority mappings between mapped default or device-specific internal priorities and corresponding device-memory-specific priorities as described herein can be implemented using a second mapping register with a second priority mapping function.

In some operational scenarios, both the first priority mapping function and the second mapping function can be implemented in an overall priority mapping function. For example, a request-type-to-priority mapper 302 of FIG. 3A may be used to implement the overall priority mapping function or the individual priority mapping functions included therein.

Figure 3C:
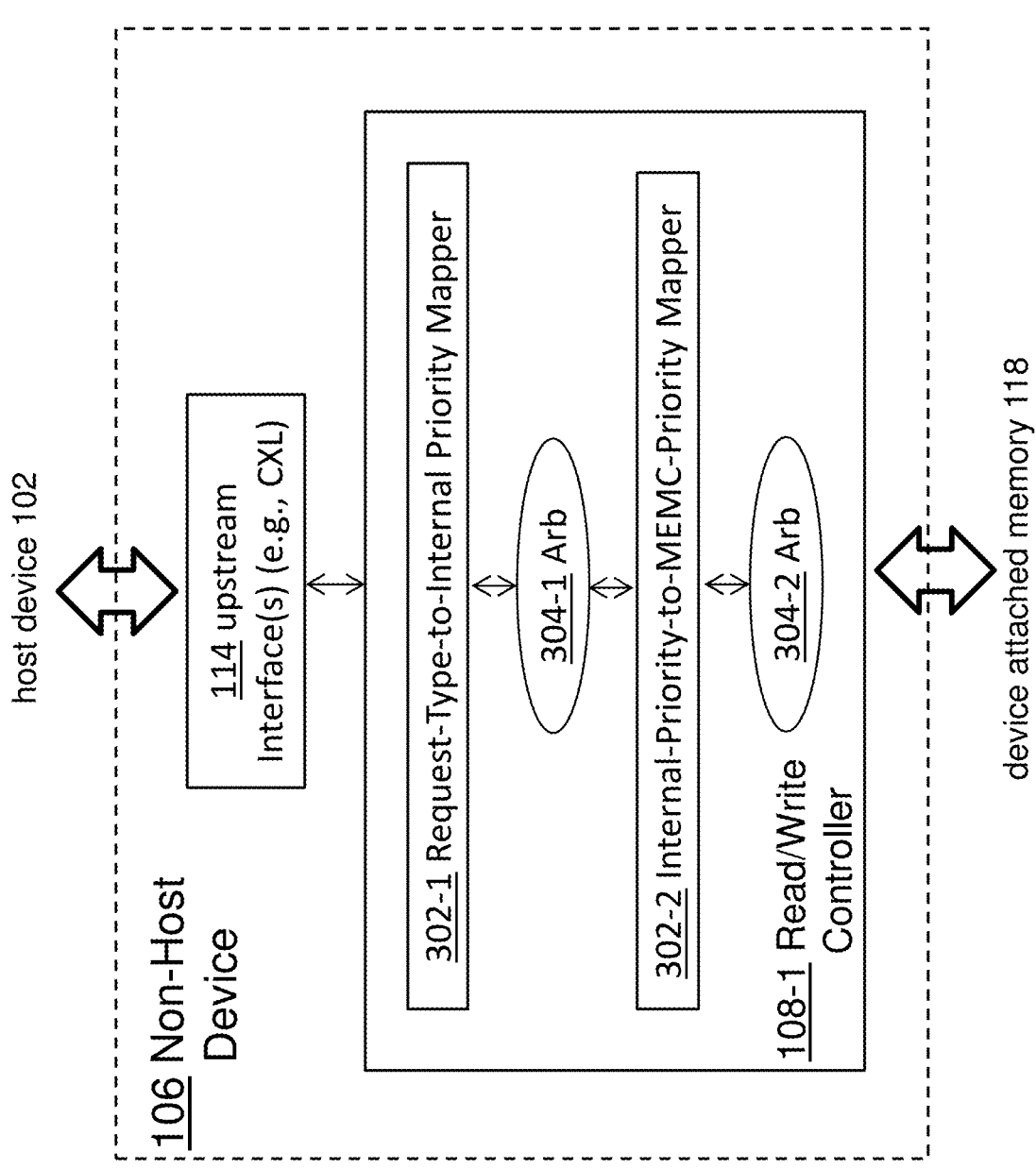

In some operational scenarios, the first priority mapping function and the second mapping function can be implemented separately. For example, a first request-type-to-priority mapper such as 302-1 illustrated in FIG. 3C may be used to implement the first priority mapping function, whereas a second request-type-to-priority mapper such as 302-2 illustrated in FIG. 3C may be used to implement the second priority mapping function.

3.4. Differentiated Priority Treatments

The non-host device 106 or the read/write controller 108 can set up different incoming/ingress queues and/or outgoing/egress queues to enqueue and dequeue memory read requests or memory reads of different TC values and/or of different mapped priorities and/or of different device-memory-specific priorities as well as corresponding memory read responses or memory read responses generated or received in connection with the memory read requests or memory reads. In some operational scenarios, a first arbiter such as 304-1 illustrated in FIG. 3C may be used to service request ingress queues for host-originated memory read requests of different TC values and/or of different mapped (e.g., default, device-specific internal, etc.) priorities, whereas a second arbiter such as 304-2 illustrated in FIG. 3C may be used to service request ingress queues for device-memory-bound memory read requests of different mapped (e.g., default, device-specific internal, etc.) priorities and/or of different device-memory-specific priorities.

The CPU 104 may make an on-demand request (or simply demand request) to load data items such as a to-be-executed-next instruction and data attendant to the instruction for execution. Such a demand request may represent a regular read needed or to be used in current operations. In some operational scenarios, complete cache misses and/or failures in local memory retrievals in performing regular reads represented by demand requests can cause the host device 102 to issue host-originated memory read requests of the demand request type to one or more non-host devices to access or read requested data items stored on one or more device memories attached to the one-host devices. In some operational scenarios, incomplete cache misses in performing regular reads represented by demand requests can cause the host device 102 to issue host-originated memory read requests of the speculative type to the non-host devices to access or read the requested data items stored on the device memories attached to the one-host devices.

The multi-level caching mechanism may issue prefetch reads such as sequential prefetches or stride prefetches for data items not presently needed or not to be used for the current operation. For example, based on a history of the current or prior instructions and/or data attendant to these instructions executed by the CPU 104, sequential prefetches or stride prefetches can be made to retrieve instructions and data for possible future execution by the CPU 104 from local memories and/or device memories attached to the non-host devices. For example, the host device 102 can issue host-originated memory read requests of the prefetch request type to the non-host devices to access or read the data items stored on the device memories attached to the one-host devices. These prefetched data items—or prefetched instructions and data—can be stored or cached in various levels of caches in the multi-level caching mechanism.

In various operational scenarios, speculative reads—or memory request messages of the speculative read type—may be generated or sent to the non-host device 106 at various time points by the host device 102.

For example, speculative reads may be generated or sent by the host device 102 to the non-host device 106, after L2 cache misses for data items in regular reads, but before L3 cache lookup operations (or cache checks) for these data items are performed or completed (e.g., encounter misses, fail to produce, etc.).

In this way, if the L3 cache misses happen, the memory read requests of the speculative read type have already been sent to the non-host device 106 and/or to a device memory controller of the device memory 118 to complete some or all operations of retrieving these data items from the device memory 118.

Hence, when memory read requests of the demand request type—representing memory real (or actual) read requests— are generated or sent by the host device 102 to the non-host device 106 after the occurrences of the L3 cache misses, some or all of these operations already performed by the non-host device 106 and/or the device memory controller and/or the device memory 118 have already been completed and hence need not to be repeated. The requested data items may already have been retrieved and buffered—or in the process of being retrieved—at the non-host device 106. Accordingly, time latencies in handling the later issued memory read requests of the demand request type—representing the memory real (or actual) read requests—may be significantly shortened or minimized.

On the other hand, if the L3 cache lookup operations result in L3 cache hits rather than L3 cache misses, then the host device 102 to the non-host device 106 can avoid generating memory read requests of the demand request type representing memory real (or actual) read requests following the speculative reads and use the data items retrieved in the L3 cache hits.

Memory read requests of various types may be issued at different stages or time points in regular or prefetch reads. For the purpose of illustration only, it has been described in FIG. 2 that speculative reads—and/or prefetch requests— may be generated or sent by the host device 102 to the non-host device 106 after the L2 cache misses and before successful or unsuccessful completion of the L2 cache lookup operations. It should be noted, however, that, in various operational scenarios, speculative read requests— and/or prefetch requests—can be generated or sent by the host device 102 to the non-host device 106 at other stages or other time points, depending on actual implementations of the host device 102 and/or the non-host device 106 and/or the applicable communication link specification that governs communication or protocol operations (e.g., speculative reads as defined in the CXL specification or another standard-based or proprietary specification, etc.) between the host device 102 and the non-host device 106.

In some operational scenarios, for host-originated memory read requests of the demand request type (e.g., a TC value "11", etc.), the non-host device 106 or the read/write controller 108 therein may assign relatively high priorities (e.g., a mapped default or device-specific internal priority "1000", the highest priorities, etc.) and hence process such read requests with relatively high or the highest urgency and relatively small or the smallest time latency, as data items requested with these read requests are needed or to be used currently or immediately by the host device 102 in carrying out its present or current operations. The host-originated memory read requests of the demand type may have been generated or sent by the host device 102 after last level cache (LLC) misses had occurred. As such, relatively high time latencies have already occurred in previous attempts to assess or read these data items needed for the current operations from other cache or memory sources.

In some operational scenarios, for host-originated memory read requests of the prefetch request type (e.g., a TC value "10", etc.), the non-host device 106 or the read/write controller 108 therein may assign priorities (e.g., a mapped default or device-specific internal priority "0100", etc.) lower than priorities assigned to the host-originated memory read requests of the demand request type and hence process such read requests with lower urgency and larger time latency than the host-originated memory read requests of the demand request type. Data items requested with the memory read requests of the prefetch request type are predicted or identified to be (e.g., possibly, likely, probably, etc.) needed or to be used in future by the host device 102 in carrying out its future or subsequent operations based on current or prior operations performed by the CPU 104 or the host device 102. Some of the prefetches represented by these requests may be stride prefetches, whereas some others of the prefetches represented by these requests may be sequential prefetches.

In some operational scenarios, for host-originated memory read requests of the relatively high priority speculative read type (e.g., a TC value "01", etc.), the non-host device 106 or the read/write controller 108 therein may assign priorities (e.g., a mapped default or device-specific internal priority "0010", etc.) lower than priorities assigned to the host-originated memory read requests of the prefetch request type and hence process such read requests with lower urgency and larger time latency than the host-originated memory read requests of the prefetch request type. In some operational scenarios, for host-originated memory read requests of the relatively high priority speculative read type (e.g., a TC value "01", etc.), the non-host device 106 or the read/write controller 108 therein may assign priorities (e.g., a mapped default or device-specific internal priority, etc.) higher than or comparable with priorities assigned to the host-originated memory read requests of the prefetch request type and hence process such read requests with lower or comparable urgency and larger or comparable time latency as compared with the host-originated memory read requests of the prefetch request type. Data items requested with memory read requests of relatively high priority speculative read type may be temporarily stored at one or more buffers of the non-host device 106 and provided to the host device 102 when real or actual reads for the same data items are received by the non-host device 106 from the host device 102.

In some operational scenarios, for host-originated memory read requests of the relatively low priority speculative read type (e.g., a TC value "00", etc.), the non-host device 106 or the read/write controller 108 therein may assign relatively low priorities (e.g., a mapped default or device-specific internal priority "0001", the lowest priorities etc.) and hence process such read requests with relatively low or the lowest urgency and relatively large or the largest time latency as compared with other request types. Similar to memory read requests of the relatively high priority speculative read type, data items requested with the memory read requests of the relatively high priority speculative read type may be temporarily stored at one or more buffers of the non-host device 106 and provided to the host device 102 when real or actual reads for the same data items are received by the non-host device 106 from the host device 102. However, as the memory read requests of the relatively low priority speculative read type is less likely to be followed with real or actual reads, the data items may be given relatively short retention times in the buffers and/or may be dropped or removed from the buffers when resources are relatively constrained (e.g., exceeding a preconfigured fill level of the buffers, etc.).

3.5. Example Process Flows

Figure 4:
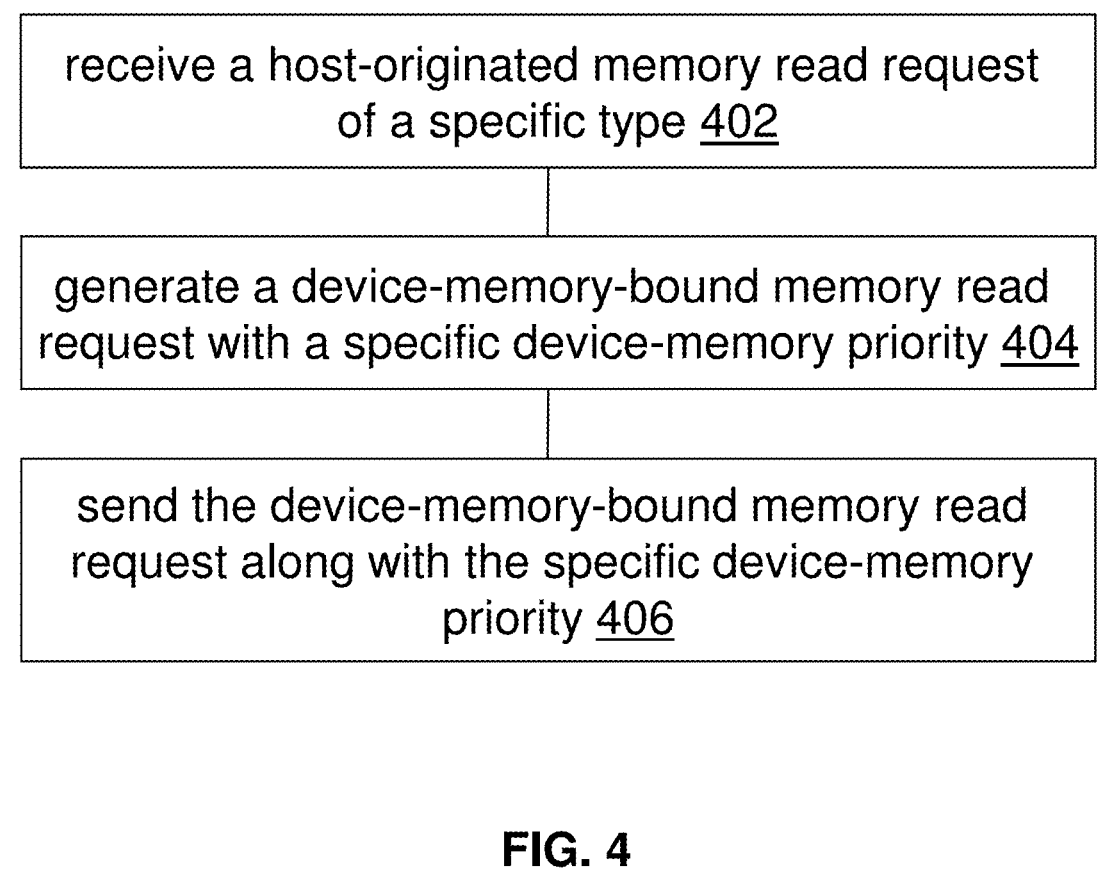

FIG. 4 illustrates an example process flow for processing memory read requests received by a non-host device (e.g., 106 of FIG. 1A, etc.) from a host device (e.g., 102 of FIG. 1A, etc.). This process flow may be executed by the non-host device 106. Block 402 comprises receiving, by a non-host device, a host-originated memory read request from a host device to retrieve data stored at a device memory attached to the non-host device, the memory host-originated read request from the host device including a specific host-assigned memory read request type attribute (e.g., a data field value, etc.).

Block 404 comprises, responsive to receiving the host-originated memory read request, generating a device-memory-bound memory read request corresponding to the host-originated memory read request, a priority mapping being applied to map the specific host-assigned memory read request type attribute to a specific device-memory priority selected from among a plurality of device-memory priorities.

Block 406 comprises sending the device-memory-bound memory read request along with the specific device-memory priority to a memory controller of the device memory to access the data stored at the device memory.

In an embodiment, the host-originated memory read request represents a Compute Express Link message; wherein the specific host-assigned memory read request type attribute represents a traffic class (TC) attribute selected by the host device from among a plurality of different TC attributes.

In an embodiment, the plurality of different TC attributes includes one or more of: a first TC attribute indicating the host-originated memory read request as a relatively low priority speculative read, a second TC attribute indicating the host-originated memory read request as a relatively high priority speculative read, a third TC attribute indicating the host-originated memory read request as a prefetch read, or a fourth TC attribute indicating the host-originated memory read request as a on-demand read.

In an embodiment, the plurality of device-memory priorities represents a set of priorities natively supported by the memory controller of the device memory; a total number of priorities in the plurality of device-memory priorities natively supported by the memory controller is different from a total number of the plurality of different TC attributes for selection by the host device.

In an embodiment, a second priority mapping is applied by the non-host device to map the specific host-assigned memory read request type attribute to a specific non-host-device priority selected from among a plurality of non-host-device priorities.

In an embodiment, the non-host device sets up a plurality of different queues for the plurality of non-host-device priorities; each queue in the plurality of different queues is set up to queue memory read requests assigned with a respective non-host-device priority in the plurality of non-host-device priorities.

In an embodiment, the non-host device performs a plurality of different sets of actions for the plurality of non-host-device priorities; each set of actions in the plurality of different sets of actions is performed on memory read requests assigned with a respective non-host-device priority in the plurality of non-host-device priorities.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
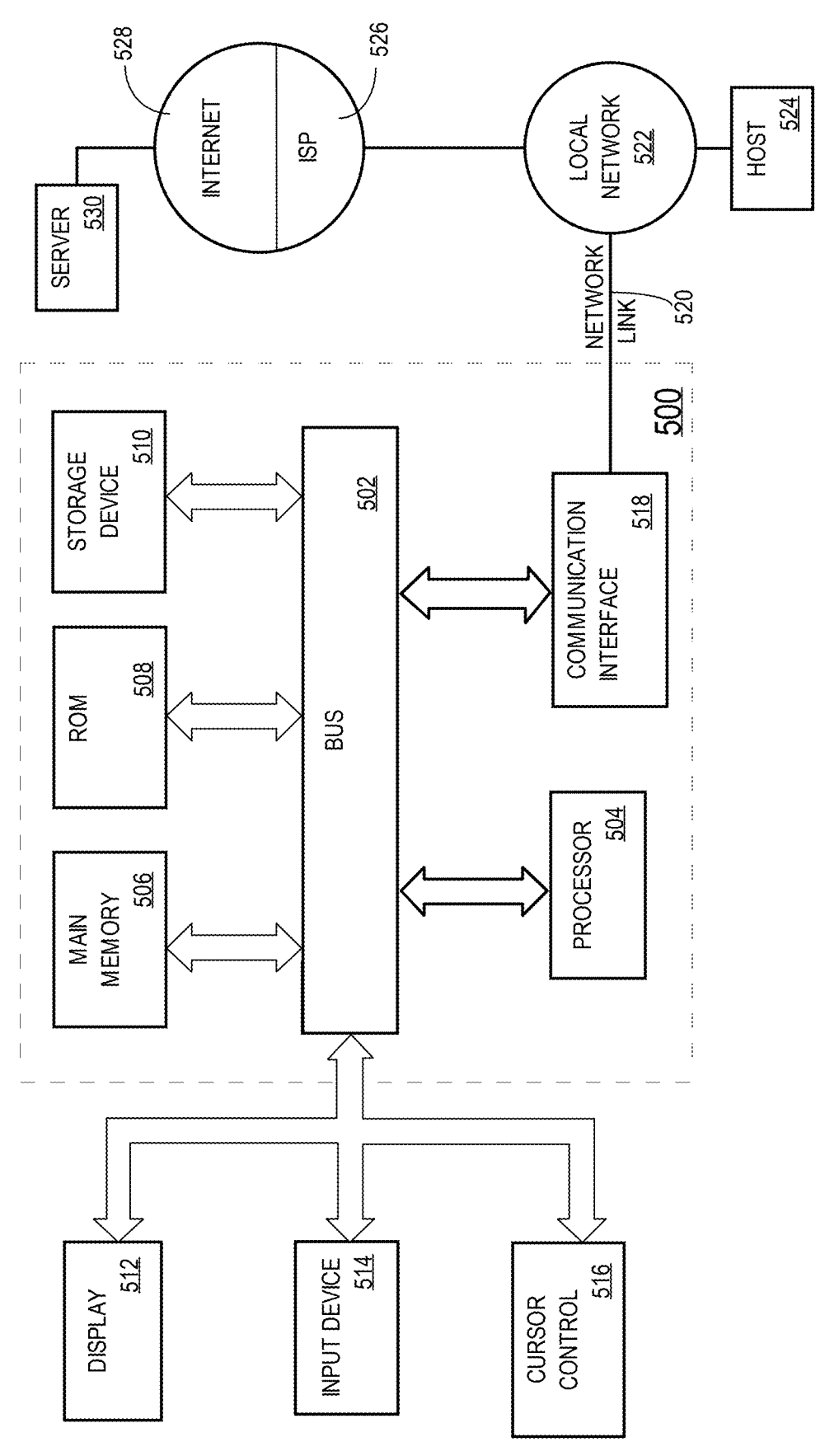
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving, by a non-host device, a host-originated memory read request from a host device to retrieve data stored at a device memory attached to the non-host device, the memory host-originated read request from the host device including a specific host-assigned memory read request type attribute that indicates a specific host-assigned read request type among a plurality of candidate host-assigned read request types;

responsive to receiving the host-originated memory read request, performing by the non-host device:

generating a device-memory-bound memory read request corresponding to the host-originated memory read request, a priority mapping being applied to map the specific host-assigned memory read request type attribute to a specific device-memory priority selected from among a plurality of device-memory priorities;

sending the device-memory-bound memory read request along with the specific device-memory priority to a memory controller of the device memory to access the data stored at the device memory.

2. The method of claim 1, wherein the host-originated memory read request represents a Compute Express Link message; wherein the specific host-assigned memory read request type attribute represents a traffic class (TC) attribute selected by the host device from among a plurality of different TC attributes.

3. The method of claim 2, wherein the plurality of different TC attributes includes one or more of: a first TC attribute indicating the host-originated memory read request as a relatively low priority speculative read, a second TC attribute indicating the host-originated memory read request as a relatively high priority speculative read, a third TC attribute indicating the host-originated memory read request as a prefetch read, or a fourth TC attribute indicating the host-originated memory read request as an on-demand read.

4. The method of claim 2, wherein the plurality of device-memory priorities represents a set of priorities natively supported by the memory controller of the device memory; wherein a total number of priorities in the plurality of device-memory priorities natively supported by the memory controller is different from a total number of the plurality of different TC attributes for selection by the host device.

5. The method of claim 1, wherein a second priority mapping is applied by the non-host device to map the specific host-assigned memory read request type attribute to a specific non-host-device priority selected from among a plurality of non-host-device priorities.

6. The method of claim 5, wherein the non-host device sets up a plurality of different queues for the plurality of non-host-device priorities; wherein each queue in the plurality of different queues is set up to queue memory read requests assigned with a respective non-host-device priority in the plurality of non-host-device priorities.

7. The method of claim 5, wherein the non-host device performs a plurality of different sets of actions for the plurality of non-host-device priorities; wherein each set of actions in the plurality of different sets of actions is performed on memory read requests assigned with a respective non-host-device priority in the plurality of non-host-device priorities.

8. A computing device comprising:

one or more computing processors;

one or more non-transitory computer readable storage media, comprising instructions, which when executed by one or more computing processors cause the one or more computing processors to perform:

receiving, by a non-host device, a host-originated memory read request from a host device to retrieve data stored at a device memory attached to the non-host device, the memory host-originated read request from the host device including a specific host-assigned memory read request type attribute that indicates a specific host-assigned read request type among a plurality of candidate host-assigned read request types;

responsive to receiving the host-originated memory read request, performing by the non-host device:

generating a device-memory-bound memory read request corresponding to the host-originated memory read request, a priority mapping being applied to map the specific host-assigned memory read request type attribute to a specific device-memory priority selected from among a plurality of device-memory priorities;

sending the device-memory-bound memory read request along with the specific device-memory priority to a memory controller of the device memory to access the data stored at the device memory.

9. The computing device of claim 8, wherein the host-originated memory read request represents a Compute Express Link message; wherein the specific host-assigned memory read request type attribute represents a traffic class (TC) attribute selected by the host device from among a plurality of different TC attributes.

10. The computing device of claim 8, wherein the plurality of different TC attributes includes one or more of: a first TC attribute indicating the host-originated memory read request as a relatively low priority speculative read, a second TC attribute indicating the host-originated memory read request as a relatively high priority speculative read, a third TC attribute indicating the host-originated memory read request as a prefetch read, or a fourth TC attribute indicating the host-originated memory read request as an on-demand read.

11. The computing device of claim 8, wherein the plurality of device-memory priorities represents a set of priorities natively supported by the memory controller of the device memory; wherein a total number of priorities in the plurality of device-memory priorities natively supported by the memory controller is different from a total number of the plurality of different TC attributes for selection by the host device.

12. The computing device of claim 8, wherein a second priority mapping is applied by the non-host device to map the specific host-assigned memory read request type attribute to a specific non-host-device priority selected from among a plurality of non-host-device priorities.

13. The computing device of claim 12, wherein the non-host device sets up a plurality of different queues for the plurality of non-host-device priorities; wherein each queue in the plurality of different queues is set up to queue memory read requests assigned with a respective non-host-device priority in the plurality of non-host-device priorities.

14. The computing device of claim 12, wherein the non-host device performs a plurality of different sets of actions for the plurality of non-host-device priorities; wherein each set of actions in the plurality of different sets of actions is performed on memory read requests assigned with a respective non-host-device priority in the plurality of non-host-device priorities.

15. One or more non-transitory computer readable storage media, comprising instructions, which when executed by one or more computing processors cause the one or more computing processors to perform:

receiving, by a non-host device, a host-originated memory read request from a host device to retrieve data stored at a device memory attached to the non-host device, the memory host-originated read request from the host device including a specific host-assigned memory read request type attribute that indicates a specific host-assigned read request type among a plurality of candidate host-assigned read request types;

responsive to receiving the host-originated memory read request, performing by the non-host device:

generating a device-memory-bound memory read request corresponding to the host-originated memory read request, a priority mapping being applied to map the specific host-assigned memory read request type attribute to a specific device-memory priority selected from among a plurality of device-memory priorities;

sending the device-memory-bound memory read request along with the specific device-memory priority to a memory controller of the device memory to access the data stored at the device memory.

16. The media of claim 15, wherein the host-originated memory read request represents a Compute Express Link message; wherein the specific host-assigned memory read request type attribute represents a traffic class (TC) attribute selected by the host device from among a plurality of different TC attributes.

17. The media of claim 15, wherein the plurality of different TC attributes includes one or more of: a first TC attribute indicating the host-originated memory read request as a relatively low priority speculative read, a second TC attribute indicating the host-originated memory read request as a relatively high priority speculative read, a third TC attribute indicating the host-originated memory read request as a prefetch read, or a fourth TC attribute indicating the host-originated memory read request as an on-demand read.

18. The media of claim 15, wherein the plurality of device-memory priorities represents a set of priorities natively supported by the memory controller of the device memory; wherein a total number of priorities in the plurality of device-memory priorities natively supported by the memory controller is different from a total number of the plurality of different TC attributes for selection by the host device.

19. The media of claim 15, wherein a second priority mapping is applied by the non-host device to map the specific host-assigned memory read request type attribute to a specific non-host-device priority selected from among a plurality of non-host-device priorities.

20. The media of claim 19, wherein the non-host device sets up a plurality of different queues for the plurality of non-host-device priorities; wherein each queue in the plurality of different queues is set up to queue memory read requests assigned with a respective non-host-device priority in the plurality of non-host-device priorities.

21. The media of claim 19, wherein the non-host device performs a plurality of different sets of actions for the plurality of non-host-device priorities; wherein each set of actions in the plurality of different sets of actions is performed on memory read requests assigned with a respective non-host-device priority in the plurality of non-host-device priorities.

\* \* \* \* \*